(12) United States Patent
Chandnani (10) Patent No.: US 8,484,645 B2
(45) Date of Patent: Jul. 9, 2013

(54) APPARATUS, AND ASSOCIATED METHOD, FOR HANDLING CONTENT PURSUANT TO TRANSFER BETWEEN ENTERPRISE CONTENT MANAGEMENT REPOSITORIES

(75) Inventor: Ashok Chandnani, Troy, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1427 days.

(21) Appl. No.: 12/136,172

(22) Filed: Jun. 10, 2008

(65) Prior Publication Data

US 2009/0307695 A1 Dec. 10, 2009

(51) Int. Cl.
*G06F 9/46* (2006.01)
(52) U.S. Cl.
USPC .......................................................... 718/101
(58) Field of Classification Search
None
See application file for complete search history.

(56) References Cited

U.S. PATENT DOCUMENTS

| | | | | |
|---|---|---|---|---|
| 5,828,880 | A * | 10/1998 | Hanko | 718/106 |
| 6,490,611 | B1 * | 12/2002 | Shen et al. | 718/103 |
| 6,748,593 | B1 * | 6/2004 | Brenner et al. | 718/105 |
| 7,400,578 | B2 * | 7/2008 | Guthrie et al. | 370/229 |
| 7,657,890 | B2 * | 2/2010 | Kanai et al. | 718/102 |
| 2002/0059317 | A1 * | 5/2002 | Black et al. | 707/200 |
| 2002/0129273 | A1 * | 9/2002 | Noonan | 713/201 |
| 2003/0074467 | A1 * | 4/2003 | Oblak et al. | 709/238 |
| 2007/0162400 | A1 * | 7/2007 | Brew et al. | 705/59 |
| 2008/0270710 | A1 * | 10/2008 | Kwon et al. | 711/147 |
| 2009/0327326 | A1 * | 12/2009 | Bahr | 707/102 |

* cited by examiner

*Primary Examiner* — Gregory Kessler (57) ABSTRACT

An apparatus, and an associated method, for facilitating bulk transfer of large volumes of data-center, ECM repository-stored content. Multiple, simultaneous threads or tasks are concurrently run both to import and to export content, as desired. A controller controls the running of the tasks and is connected to a thread container that runs the tasks by way of a TCP/IP socket or other suitable communication connection.

17 Claims, 4 Drawing Sheets

APPARATUS, AND ASSOCIATED METHOD, FOR HANDLING CONTENT PURSUANT TO TRANSFER BETWEEN ENTERPRISE CONTENT MANAGEMENT REPOSITORIES

The present invention relates generally to a manner by which to perform batch transfer of digital content across multiple types of Enterprise Content Management (ECM) systems. More particularly, the present invention relates to an apparatus, and an associated methodology, by which to facilitate large-volume, content migration between repositories in which the data transfer is controlled to optimize better the transfer.

Multiple, simultaneous tasks for importing data to a repository, exporting data from a repository, or both importing and exporting data to and from a repository, are carried out in a controlled manner, to optimize the best transfer of the content. High volume ingest of documents, images, and digital content from any of various creation sources, such as a scan center, an electronic document creating/publishing system, as well as an ECM repository is further provided.

BACKGROUND OF THE INVENTION

Digital processing, mass storage, and other computer-related technologies have profoundly impacted modern society. Many business, and other activities require access to and use of mass-stored data to carry out normal operations. And, data generated during business, or other enterprise operations regularly need to be archived, available for subsequent retrieval.

Sometimes, an enterprise utilizes one or more on-site storage devices, such as computer servers, at which to store data, including archival data. The storage server is sometimes also networked to other computer stations of the enterprise by network connections, either local area network (LAN) or wide area network (WAN) connections. Users of network-connected computer stations are able, if authenticated and authorized, to access the stored data. Such a server is sometimes referred to as being a repository of data. And, more generally, any device at which content is stored is referred to as a repository. In an ECM system, the repository is sometimes referred to as being an ECM repository.

Sometimes, data is stored at dedicated data centers, either integral with, or remote from, an enterprise facility. A data center typically is positioned at a location having a stable, and sometimes also redundant, power supply of power capacities permitting powering of storage and other processing devices maintained at the data center. Ambient conditions at the data center are also typically maintained, best to ensure that the ambient conditions do not affect operations of devices maintained thereat.

Data centers sometimes contain third-party Enterprise Content Management (ECM) data repositories which store, typically, large-volume and bulk data, sometimes of terabyte, or greater (petabytes), volumes of data. At a data center which contains an Enterprise Content Management (ECM) system, a system operator or administrator of such a repository, conventionally utilizes vendor-provided proprietary technology with respect to the storage of, access to, and transfer of, content. An ECM system typically contains a combination of unstructured data, i.e., content such as images, documents, pictures, sound files, video, etc. which need structured data to manage such content. Structured data typically comprises data that can be organized in databases, e.g., arranged in rows and columns. The volume of unstructured data often exceeds that of the structured data by several thousands of magnitude. And, ECM systems, therefore, oftentimes have a very large data storage footprint.

ECM systems often store the content and structured data combination in proprietary format. The storage in the proprietary manner generally limits the content ingest and export functions to the vendor's tools and programming interfaces. The vendors often do not provide a published data dictionary. Due to the typically-proprietary nature of the technology, once content is stored at a data-center repository of an ECM system, the content, in its entirety, can only be moved to another ECM repository that uses a different proprietary technology with great difficulty. And, due to this difficulty in transferring the data, sometimes the content owner is constrained to continue to store the content in the same vendor's repository, even if the content owner has significant motivation or desire to store the content in another vendor's repository.

Conventional data import and data export tools available for use to transfer content typically are custom-written and have only limited features. For instance, sometimes only import capabilities are provided, and no export capabilities are provided. This limits the manner by which content is later exportable. And, to the extent that the content is later transferred, i.e., exported, from an ECM repository, the export tools, generally custom-written export utilities, regularly are unable to transfer significant amounts of content at high transfer rates. The custom utilities sometimes are required to transform formats of the stored content to the requirements of another ECM repository to which the content is to be transferred. When custom-written, such utilities are generally highly proprietary and not reusable.

Additionally, import and export tools conventionally available to transfer content generally do not include much control capability. The conventional tools and mechanisms, when used to transfer significant levels of content, do not typically include control mechanisms permitting batch-volume management of the content transfer, such as stop and restart capabilities or transfer rate change capabilities. And, such conventional tools also provide minimal monitoring capabilities. Often, the control utility has to be engaged by the system operator only at startup and does not allow for dynamic control thereafter It is apparent, in light of the foregoing, therefore, that existing content import and export tools suffer from various deficiencies that limit their usefulness.

If an improved manner could be provided by which better to transfer content, i.e., import content to an ECM repository and export content from an ECM repository, content owners would be better able to take advantage of ECM system improvements available at state-of-the-art data-centers containing such repositories. Such an improvement would enable ease of content transfer across different vendor repository types bringing the most economic ones commercially to the advantage of the customer. By making it easier to transfer content across repositories or ingest content into several different repository types at a data center, data center owners can offer ECM functions more like a utility or a service rather than a proprietary system locked into one vendor's technology. ECM offered as a as a utility would allow for image archiving, content management for several customers on one or many system with no awareness to the technical software layer underneath the utility.

It is in light of this background information related to mass storage of content that the significant improvements of the present invention have evolved.

SUMMARY OF THE INVENTION

The present invention, accordingly, advantageously provides an apparatus, and an associated methodology, by which to perform transfer of digital content across multiple types of ECM (Enterprise Content Management) systems.

Through operation of an embodiment of the present invention, a manner is provided by which to facilitate large-volume, content migration between ECM repositories in which the content transfer is controlled to optimize better the transfer.

In one aspect of the present invention, therefore, a content handler is provided that handles digital content pursuant to batch transfer between ECM repositories. Multiple, simultaneous tasks are performed to transfer data in a controlled manner. Multiple, simultaneous tasks, i.e., threads, are run to import content to a repository, to export content from another repository, or simultaneously to both import and to export content to and from one or more ECM repositories.

In another aspect of the present invention, a controller controls the simultaneous running of the multiple tasks to facilitate transfer of content pursuant to its import or export. The controller controls the number of threads that simultaneously run, thereby to facilitate control of the rate at which the content is transferred. The control includes the capability to start, stop, query the status, restart, and select the threads that run pursuant to import and export operations.

In another aspect of the present invention, the control of the running of the multiple, simultaneous tasks permits the rates of data transfer to be time-dependant. That is to say, the data transfer rate is controlled to be of a first rate during a first time period and of a different rate during another time period.

In another aspect of the present invention, control over the running of the tasks further provides for the balancing of the transfer loads. Balancing is provided, e.g., by distributing the work between the appropriate numbers of import worker threads and export worker threads.

In another aspect of the present invention, the control over the running of tasks is provided in a silent, unattended mode. That is to say, the control is carried out, and the tasks are run in manners that do not require human operator intervention. The multiple, simultaneous running of the tasks is readily carried out at any time of day or night, automatically, free of the need of operator input during all time periods of operation.

In another aspect of the present invention, the content handling mechanism is reusable. That is to say, the content handling functionality for importing and exporting content used by simultaneously running multiple, simultaneous tasks is usable upon generic data and is not proprietary to a particular ECM-system technology. And, the functionality of the content handling is extendable to additional repository technologies. For instance, the thread manager can be extended across an other newer ECM repository, such as Sharepoint.™ (Reuse level 1). Once extended to such additional repository technologies, the content handler is reusable pursuant to bulk transfer of data with other repositories of the same, extended technology.

In another aspect of the present invention, the content handling functionality is implemented as java threads that run in a thread container. High load handling rates are possible as the number of threads that can be run to perform work tasks simultaneously is easily increased. Content transfer at optimal transfer rates is thereby facilitated. Both adaptability and reusability are thereby provided.

In another aspect of the present invention, the content handling functionality is configured to run in a distributed architecture, e.g., importer threads are embodied at one server and exporter threads are embodied at another server. Load balancing and work management is facilitated through use of the distributed architecture. That is to say, through appropriate control of the thread execution, the transfer load can also be balanced across one or more servers in the distributed architecture type of arrangement.

In another aspect of the present invention, the content handler provides export and import tool functionality that is permitting of continuous data extraction and loading. Extendibility of the functionalities of the content handler is provided by adding import or export threads for a new repository. The resultant content handler becomes a data migration tool capable of operating upon content associated with the additional repository. And, in a further implementation, the thread manager is reused to provide operability pursuant to other functionalities, such as loading of a web site with 'hits' by firing several threads against the website or otherwise to be used as a testing tool (Reuse Level 2).

In another aspect of the present invention, the content handler further is provided with the capability to add custom threads that are used pursuant to pre-processing and post-processing functions that adjoin data export and import, respectively. Exemplary pre- and post-processing functions include, e.g., starting of a workflow, e.g., to review and approve content, just-ingested, by putting the content in the mailbox of a supervisor clerk, or sending of a confirmation email to provide a party an alert that the content has been exported.

Thereby, a reusable, extendable content handler is provided to facilitate the transfer of large volumes of data, either to import or export the content, or both, of an ECM-system repository.

In these and other aspects, therefore, a content handler, and an associated methodology, is provided for facilitating batch transfer of repository-storable, generic digital content. A thread container is configured simultaneously to run tasks upon multiple digital-content portions pursuant to a batch transfer of the repository-storable, generic, digital content. A thread controller is configured to control simultaneous running of the tasks upon the multiple digital-content portions pursuant to the batch-transfer of the repository-storable, generic digital content. The thread controller is capable of controlling simultaneous running of the tasks upon the multiple digital-content portions pursuant to the batch transfer of the repository-storable, generic digital content operational on one or more thread containers that are configured simultaneously to run tasks upon multiple digital-content portions pursuant to a batch transfer of the repository-storable, generic, digital content.

A more complete appreciation of the scope of the present invention and the manner in which it achieves the above-noted and other improvements can be obtained by reference to the following detailed description of presently-preferred embodiments taken in connection with the accompanying drawings that are briefly summarized below, and by reference to the appended claims.

DETAILED DESCRIPTION

Figure 1:
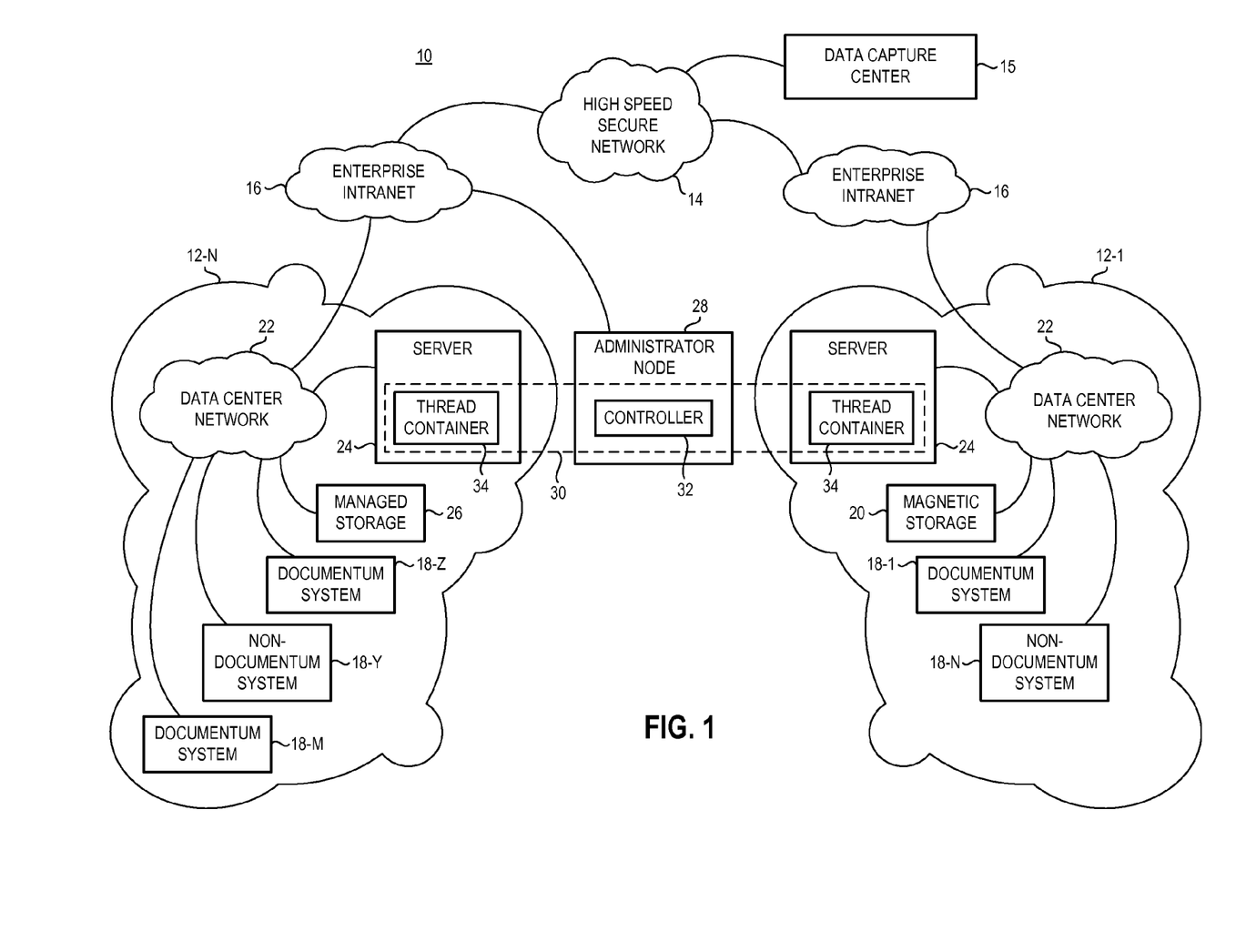
FIG. 1 illustrates a functional block diagram of an arrangement in which an embodiment of the present invention is operable.

Referring first to FIG. I, an arrangement, shown generally at 10 includes a plurality of data centers 12 that are selectively provided with external communication conductivity. Here, the external communication conductivity is provided by way of a high-speed, secure network 14 that extends to enterprise intranets 16. The data centers each contain storage repositories that are part of, e.g., enterprise content management (ECM) systems. Here, different ones of the data-center repositories are operated by different ECM operators, utilizing different types of proprietary storage mechanisms.

The first data center 12-1 includes system entities 18-1 and 18-N and a private magnetic storage device 20. The entities 18 and 20 are connected to a data-center network 22. A server 24 is also connected to the data-center network 22. The network 22 is placed in communication connectivity with the enterprise intranet. The entity 18-1 utilizes a Documentum™ system, and the entity 18-N utilizes a non-Documentum system.

The data center 12-N also includes system entities, here entities 18-M, 18-Y, and 18-Z, and a managed storage element 26, that are connected to a data-center network 22. A server 24 is also coupled to the network 24, and the network 22 is placed in communication connectivity with the enterprise intranet 16. Here, the entity 18-M is representative of a Documentum system that is operated as a public utility (implying ECM functions provided as a service to several customers on one system), the entity 18-Y is representative of a non-Documentum system, and the entity 18-Z is representative of a Documentum system that is operated as a private utility (implying ECM functions provided as a service to several business units of one customer only).

In general, a data center, such as the data center 12-1 or 12-N, is a physical, or logical, location that provides for the storage of content, i.e., any type of computer-readable, digital or other, information. A data center typically includes computer servers, here the entities 18, having large storage capacities that are capable of storing large volumes of data. The data associated with a particular enterprise is stored at one or more data servers located at one or more data centers. More generally, the entities 18 are representative of repositories that store content. The data-center repositories provide for the long term storage of data. Several repositories are a part of ECM systems provided by one or more different providers. Access to the data is controlled by controlling access to the data-center network, and sometimes the data is remotely accessible by parties that are authorized and authenticated, such as by way of the high speed secure network 14. A data capture center 15 is here shown to be in communication connectivity with the network 14. The data capture center is representative of a location at which content is ingested, such as a scan center.

A data center repository that is a part of an ECM systems comprises content stored at a data-center repository that is of any of various types, both structured and unstructured. Exemplary unstructured data storable at a data-center repository include digital photographs, audio clips, media files, text documents, etc. And, exemplary structured data includes, e.g., database records, SAP records, etc. Structured data facilitates the orderly indexing, search and management of unstructured content within an ECM system through the various stages of the life cycle of the content.

As mentioned previously, the data, once stored at a repository, is oftentimes difficult to move in bulk. That is to say, the data, once stored at a data center's ECM repository can generally be transferred only with significant difficulty. To the extent that export tools, i.e., mechanisms that facilitate the transfer of stored content, are available, such tools are generally custom-constructed for a specific product. Existing tools are generally not readily adaptable for repeated use and are generally limited to a single-use to transfer content associated with a particular repository that uses a particular storage scheme. Existing tools lack the ability to be extendable and also require manual means of monitoring. Existing tools lack the controlling mechanisms ability to transcend the network boundaries of data centers and manage them centrally from within one controller.

The arrangement 10 further illustrates an administrator node 28, here positionable in communication connectivity with the intranets 16 and, in turn, the data centers 21-1 and 12-N. Administrative functions are carried out at the administrator node.

The arrangement 10 further includes an apparatus 30 of an embodiment of the present invention that provides content handling functionality to facilitate transfer of content storable at a data-center repository, such as that located at an entity of any of the data centers 12. The functionality of the apparatus 30 is not limited to use with a particular repository that utilizes a particular storage scheme. Rather, the content-handling functionality is amenable for reuse to perform content handling functions to transfer content at any of the various repositories using any of the various storage schemes.

In the exemplary implementation, the apparatus 30 comprises a controller 32 and a thread container 34 that are positioned in communication connectivity, here by way of a TCP/IP socket 36. The controller is here embodied at the administrator node 28, and the thread container is embodied at one or more of the data centers 12, here at the servers 24 of the data centers 12-1 and 12-N. While shown to directly interconnect the elements 32 and 34, in an exemplary implementation, the connection 36 is by way of the intranet 16 and the data center network 22. More generally, the elements 32 and 34 of the apparatus 30 are positionable at any of various locations as long as control of the running of threads at the thread container can be carried out. And, in other words, the controller 32 forms a task controller of tasks embodied at one or more task containers 34. In operation, content handling functions are performed, e.g., to transfer content between storage locations and data centers. As the apparatus is reusable, and not custom-constructed merely for use at a single repository that utilizes a specific storage scheme, the apparatus 30 is subsequently useable at, and with, others of the data centers to perform content handling functions thereat. And, while the exemplary illustration shows thread containers to be positioned at the servers 24, thread containers are positionable at other, or additional, entities, such as any of the entities 18. Also, in general, the apparatus 30 operates to import, to export, or both to import and to export content to, and between, repositories. The content handling is performed upon content irrespective of its type. That is to say, with respect to the content handling operations, the content is considered to be repository-neutral-formatted, or generic, content, storable at a repository.

Content handling functionality is facilitated by packaging content in a repository-neutral format, viz., from the perspective of the apparatus 30, the content is generic. Operation includes batching the data in zip files representing a batch of content. In the exemplary implementation, the metadata or structured part is reduced to an xml specification that is self describing. And, the content is held in native format such as .jpg or .pdf or .doc and several other formats of the data. In this exemplary scenario, the xml specification holds the name of the content file against the rest of the metadata (e.g., business index information). Import threads of the application are capable of validating the xml file for accuracy and correct format and report errors should the batch be malformed or content being absent. One batch specification can have one or more pieces of content and corresponding metadata. The importer uses the metadata to populate the target repository using a thread built that is aware of the API functions of the target repository. Batch specification has, e.g., the source and target repository document types that are different but the attributes (metadata) are the same. Exporter threads create the zip file and shares its location to the importer thread which reads the neutral format of the batch and imports the tiff image to the target repository. The batch can be ported to the target location by any of various mechanisms. A network shared location is an exemplary mechanism by which to accomplish the data transfer. The packages can contain one piece of content per file or more than one piece of content per batch file. In analogous manner, import of content can be carried out at a scan center. Transfer of data, in such an operation, comprises the import of the content to a repository.

For instance, content is transferable between any of the entities 18, including those positioned within a common data center or at disparately positioned locations.

Content handling functions are carried out, if desired, in an unattended mode permitting running of the content handling operations silently without continuous administrator oversight. That is to say, content handling functions are carried out without the need for a custom user interface that necessitates an administrator to be in attendance to operate the content handling operations of the apparatus. Additionally, the content handling functionalities provide both import and export capabilities, capable of handling large volumes of documents or electronic, e.g., on the order of 250,000 images per day. Further, the content handling functionalities of importing and exporting are simultaneously performable across multiple kinds of ECM-system repositories. And, the functionality provides a common, reusable, content-handling application usable with any of various content/workflow/database management storage schemes. And, import method data and repository attributes are matched in order to support successful import without the need to change coding through the configuration of an XML file that carries metadata.

Figure 2:
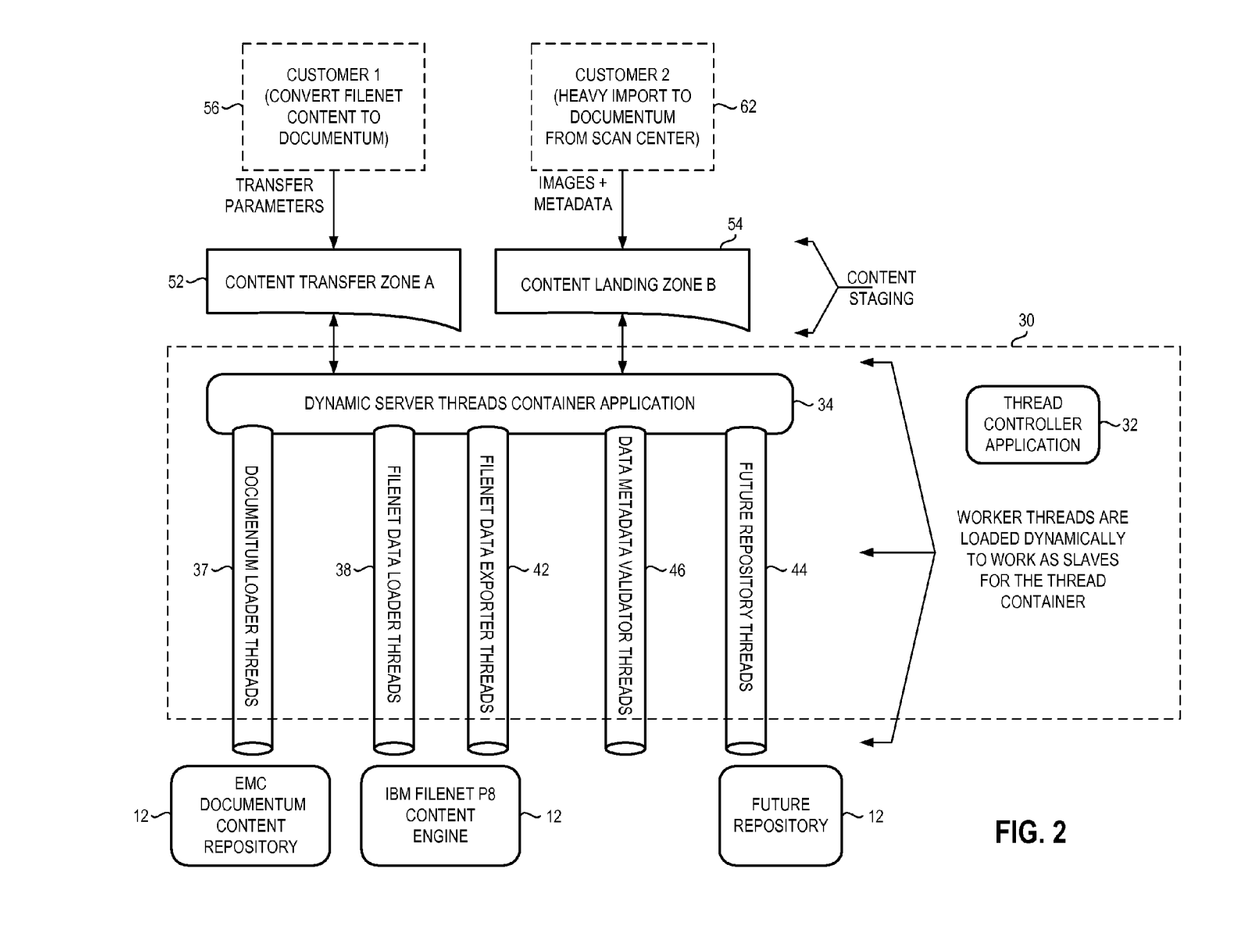
FIG. 2 illustrates a functional view of portions of the arrangement shown in FIG. 1.

FIG. 2 shows functionally the apparatus 30 positioned to perform content handling functions upon content stored at entities of any of various data-centers 12. Here, a first data-center repository 12-1 has an entity that uses an EMC Documentum™ content scheme, a second data-center repository 12-N has an entity that uses an IBM FileNet™ content engine, and a data center 12-N-1 is representative of a data-center repository having an entity that uses future-defined attributes. Its representation in FIG. 2 is illustrative of the capability of the apparatus 30 to be extended to additional repositories having additional types of storage schemes.

The controller, represented as a controller application 32, and the thread container, represented as a thread container application 34, operate dynamically. The elements 32 and 34 are functionally represented, implementable in any desired manner, including, e.g., by algorithms executable at a processor. Also, in one implementation, the container 34 and the controller 32 are physically embodied at a common location. In an alternate implementation, and as shown in FIG. 1, the elements 32 and 34 are positioned remote from one another and are only functionally interconnected.

A thread loader 37 extends between the container 34 and the data-center repository 12-1 and is representative of the loading of threads used pursuant to content handling functions of content imported to, or exported from, the data-center repository 12-1. The lines 38 and 42 are representative of loader threads and exporter threads, respectively, that operate to import and export content to and from, respectively, the FileNet content engine formed of the data-center repository 12-N. And, the path 44 is representative of threads used pursuant to import and export functionalities with the repository 12-N-1 of content stored, or storable, pursuant to a future-defined scheme. Additionally, the path 46 is illustrated. The path 46 is representative of threads that are used pursuant to metadata validation. Metadata is data associated with data, such as the data stored at, or stored to, any of the data-center repositories 12. The apparatus 30 further provides for the performance of pre-processing and post-processing of content.

In operation, the content handling functionality, to import content, to export content, and both to import and export content is carried out, if desired, simultaneously under the control of the controller 32. The thread controller 32 controls, for instance, the threads that are allocated for import and for export, etc. The controller dynamically controls loading of worker threads that work as slaves to the thread container 34. Through appropriate selection and allocation of the threads, content handling is carried out upon the data-center repository 12.

The handling of the content is carried out in a staged manner. And, here, the stages 52 and 54 are illustrated. The staging zone 52 is representative of a first content transfer zone (zone A), and content transferred thereto is handled pursuant to transfer parameters. The block 56 is representative of exemplary staging-zone operations carried out by running of tasks by the execution of threads upon the content, here to convert FileNet™ content to Documentum™ content. Analogously, the second content landing zone (zone B) 54 is here representative of a content-staging zone that stages transfer of images and metadata, such as that which is transferred, indicated by the block 62, when content imported from, e.g., a scan center, such as the data capture center 15, shown in FIG. 1.

Figure 3:
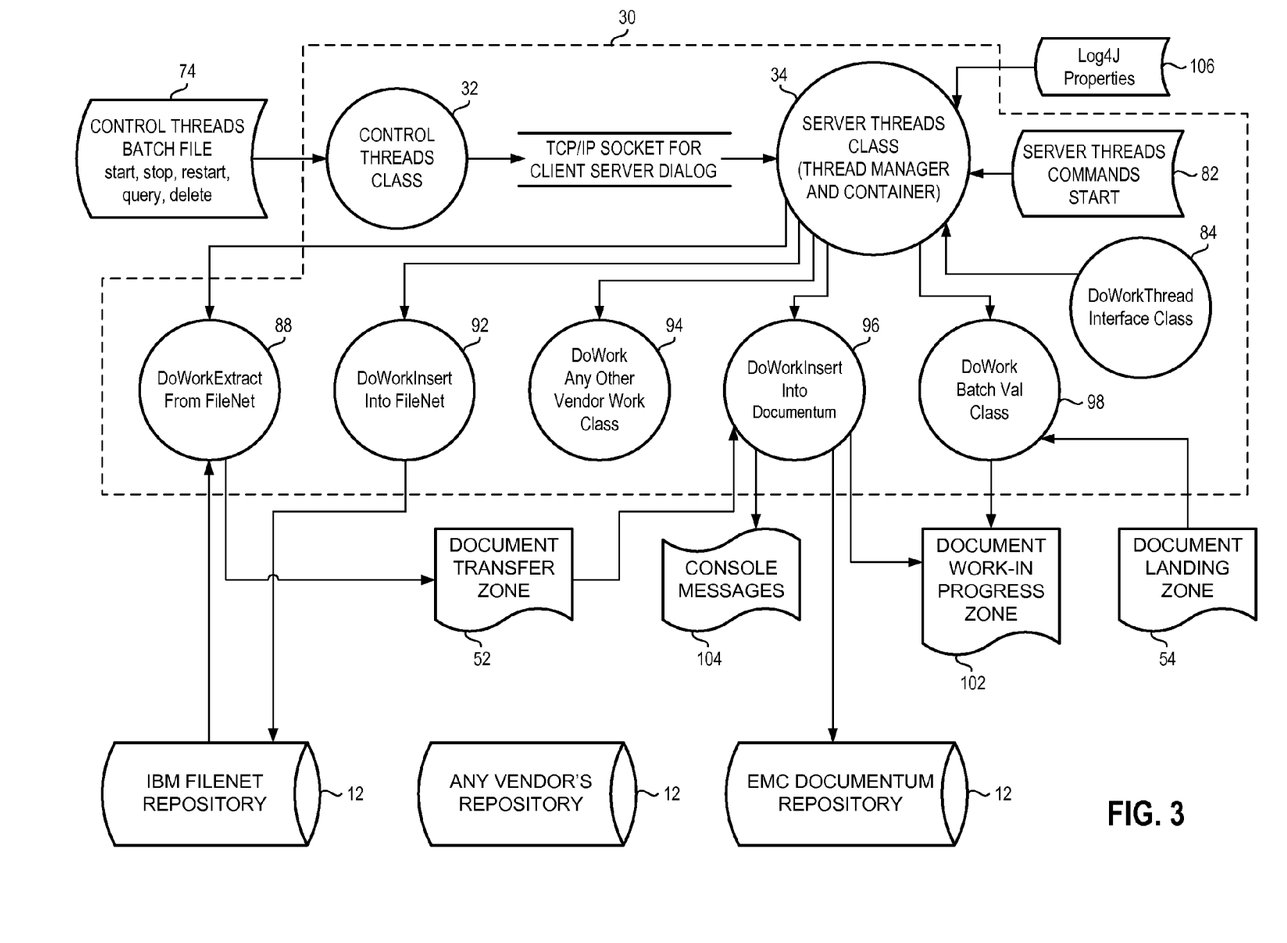
FIG. 3 illustrates a modular view of an embodiment of the present invention.

FIG. 3 illustrates, in module form, the content handling apparatus 30. Here, the apparatus is configured as multiple modules that are retrieved and executed during content handling, and other operations. Again, the thread container 34 and the controller 32 are represented. Threads running during operation of the apparatus are managed by the common controller in which one ControlThreads class, here indicated at 32, is capable of receiving various commands indicated at the block 74, including start, stop, query, and delete commands to control the threads on each server thread container.

The server thread container here includes the thread manager and container 78, a server threads commands start module 82, and a do work thread interface class module 84. The controller and the thread container are interconnected by way of the TCP/IP (transport control protocol/internet protocol) socket 36 here, specifically, for client server dialogue.

Additional modules are also available to the thread container, including a do work extract from FileNet™ 88, a do work insert into FileNet™ 92, a do work of any other vendor work module 94, a do work insert into Documentum™ 96, and a do work batch val class module 98. These modules are inherited from the interface class namely the do work interface class module. The extendibility of the apparatus is made possible by extending the do work thread interface class 84 to do work of any other vendor work module 94.

The transfer and landing zones 52 and 54 are again shown, and a document work in progress zone 102 is also shown. Console messages 104 generated, for instance, pursuant to execution of the module 96, is also shown. And, a properties file 106 is further shown. This file controls the logging behavior of the application for messages that are provided. The logging levels supported are ERROR, WARN, INFO and DEBUG. The level of messages increases as the logging level is changed from ERROR to DEBUG. At ERROR only errors are reported. At WARN errors and warnings are reported. At INFO errors, warnings and informational messages are shown, and at DEBUG all 4 message types are displayed. The properties file 106 also controls the log file size and rotations when they get full. Operation of the apparatus to carry out content handling functionality is usable with any of various content/workflow/database management and storage scheme. Import metadata and repository attributes are matched to support successful import without the need to alter handler code through the configuration of an XML file that carries the metadata. The module 98, the do work batch val accomplishes the content batch file validations so that the transfer will be successful without errors, which can be operated under several threads of execution.

In the exemplary implementation, content handling functionality facilitates launch of Java classes in a dynamic manner as separate threads of execution in a Java run time environment. A manager can be queried for the status of a single thread. And, remote control of the thread container 34 by way of the TCP/IP socket link is also permitted. Threads can be stopped, quiesced, changed to perform at different priorities, and restarted whenever desired to allow for operator intervention. The thread can perform any desired logic, and the dynamic thread manager is reusable to any application that needs the ability to control the threads during their execution not just ECM import and export functions. This can be done by extending the do work thread interface class 84 to do work of any types that is not ECM oriented.

The Thread manager allows for operator control over its parameters during launch of execution of the apparatus as well as during its execution. Additionally, the Thread manager has built-in monitoring that report statistics.

The module 84 is here representative of modules created that are extensions to various content management functions, e.g., high performance content export or workflow launch, as well as high volume data import.

Additionally, load balancing across one or more servers in a distributed architecture is possible. The design and administration of real-life data unloading and loading situations for optimum performances is facilitated. Threads are inherited from a common interface class and can be programmed for both import or export of data and be operational under one container simultaneously. As noted above, in the exemplary implementation, Java technology is utilized. Its use facilitates portability across multiple, mid-range platforms including Windows™-based and Unix based platforms such as Sun Solaris™, RedHat Linux™ and IBM-AIX™.

Figure 4:
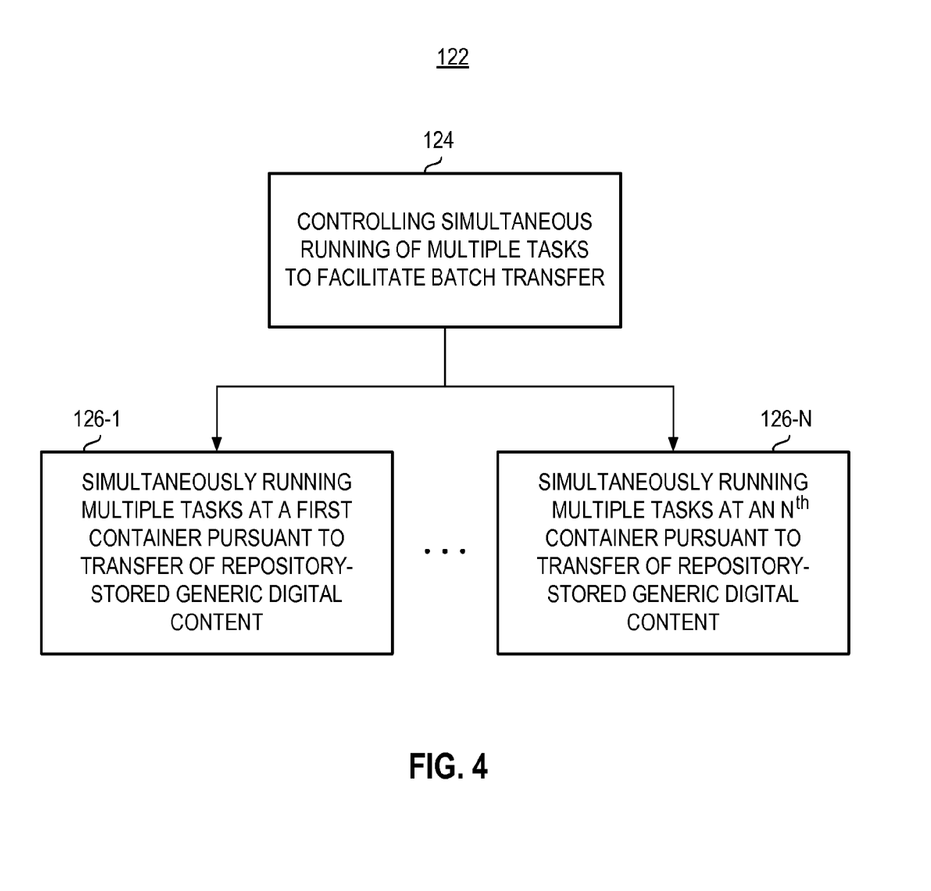
FIG. 4 illustrates a method flow diagram representative of the method of operation of an embodiment of the present invention.

FIG. 4 illustrates a method flow diagram, shown generally at 122 representative of the method of operation of an embodiment of the present invention. The method facilitates batch transfer of large volumes of content.

As indicated by the block 124, control is exerted over the simultaneous running of multiple tasks to facilitate batch transfer. And, as indicated by the blocks 126-1 through 126-N, multiple tasks are simultaneously run at least at one, and here N, containers pursuant to the transfer of repository-stored, generic digital content.

Various benefits are provided through the content handling functionality provided pursuant to an embodiment of the present invention. Through use of the threads for larger volumes, a high-performance, data exporter and importer of ECM-repository-stored content is provided. Relatively straightforward extension of operation is provided to further perform pre-processing and post-processing functions before and after the import and export operations. Modifications are also relatively easily made for repositories that utilize new and different storage schemes.

Presently preferred embodiments of the invention and many of its improvements and advantages have been described with a degree of particularity. The description is of preferred examples of implementing the invention and the description of the preferred examples is not necessarily intended to limit the scope of the invention. The scope of the invention is defined by the following claims.

What is claimed is:

1. An apparatus having instructions stored on non-transient computer-readable media and executable by a processor for facilitating batch transfer of repository-storable generic digital content, said apparatus comprising:
    a task container configured to run multiple simultaneous tasks as threads executed by a content handler to transfer the repository-storable generic digital content between enterprise content management (ECM) repositories; and
    a controller configured to control running by said task container of the multiple simultaneous tasks,
    wherein said task container is configured to run multiple simultaneous tasks pursuant to simultaneous import and export of repository-storable generic digital content.

2. The apparatus of claim 1 wherein said task container is configured to run the multiple simultaneous tasks pursuant to import of the repository-storable generic content.

3. The apparatus of claim 2 wherein said task container is further configured to run multiple simultaneous tasks pursuant to import of metadata associated with the repository-storable generic content.

4. The apparatus of claim 1 wherein said task container is configured to run the multiple simultaneous tasks pursuant to export of the repository-storable generic content.

5. The apparatus of claim 4 wherein said task container is further configured to run multiple simultaneous tasks pursuant to export of metadata associated with the repository-storable generic content.

6. The apparatus of claim 1 wherein said task container is further configured to run multiple simultaneous tasks pursuant to transfer of metadata associated with the repository-storable generic digital content.

7. The apparatus of claim 1 further comprising a communication connection configured to interconnect said task container and said controller.

8. The apparatus of claim 7 wherein said task container is positioned remotely from said controller.

9. The apparatus of claim 1 wherein said controller is configured to control a rate at which the repository-storable generic digital content is batch transferred.

10. The apparatus of claim 1 wherein said controller is configured to control load balancing of individual threads during content transfer provided by said task container pursuant to the running of the simultaneous tasks.

11. The apparatus of claim 1 wherein said task container is further configured to run tasks to perform pre-processing tasks subsequent to the transfer of the repository-storable generic digital content.

12. The apparatus of claim 1 wherein said task container is further configured to run tasks to perform post-processing tasks subsequent to the transfer of the repository-storable generic digital content.

13. A method for facilitating batch transfer of repository-storable generic digital content, said method comprising:
- simultaneously running multiple tasks pursuant to transfer of the repository-storable generic digital content;
- loading threads pursuant to content handling functions of content imported to and exported from a data center repository; and
- controlling the simultaneous running of the multiple tasks executed as threads to facilitate the batch transfer,
- wherein said simultaneously running comprises simultaneously running the multiple tasks pursuant to export of the repository-storable generic digital data from the first repository and importing the repository-storable generic digital data to the second repository.

14. The method of claim 13 wherein said simultaneously running the multiple tasks comprises simultaneously running the multiple tasks pursuant to transfer of the repository-storable generic digital data between a first repository and a second repository.

15. The method of claim 13 wherein the first repository operates pursuant to a first storage scheme and wherein the second repository operates pursuant to a second storage scheme.

16. The method of claim 15 wherein said simultaneously running further comprises simultaneously running the multiple tasks to convert the repository-storable generic digital data to be storable at the second repository pursuant to the second storage scheme.

17. The method of claim 13 wherein said controlling comprises controlling a transfer rate at which the batch transfer is carried out.

* * * * *